United States Patent
Nusbickel

(10) Patent No.: US 6,633,874 B1
(45) Date of Patent: Oct. 14, 2003

(54) METHOD FOR IMPROVING THE PERFORMANCE OF A WEB SERVICE BY CACHING THE MOST POPULAR (REAL-TIME) INFORMATION

(75) Inventor: Wendi L. Nusbickel, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/405,877

(22) Filed: Sep. 24, 1999

(51) Int. Cl.$^7$ .............................................. G06F 17/30
(52) U.S. Cl. ................ 707/10; 707/1; 707/3; 711/118; 711/133
(58) Field of Search .......... 707/1–10, 100–102, 707/104, 200, 205, 104.1; 711/113, 118–146; 709/200–203

(56) References Cited

U.S. PATENT DOCUMENTS

| | | | | |
|---|---|---|---|---|
| 5,819,092 A | * | 10/1998 | Ferguson et al. | 705/39 |
| 5,892,917 A | * | 4/1999 | Myerson | 709/224 |
| 5,911,146 A | * | 6/1999 | Johari et al. | 707/525 |
| 5,933,832 A | * | 8/1999 | Suzuoka et al. | 707/101 |
| 5,943,672 A | * | 8/1999 | Yoshida | 707/10 |
| 6,018,619 A | * | 1/2000 | Allard et al. | 395/200.54 |
| 6,052,439 A | * | 4/2000 | Gerszberg et al. | 379/216.01 |
| 6,101,537 A | * | 8/2000 | Edelstein et al. | 709/219 |
| 6,185,608 B1 | * | 2/2001 | Hon et al. | 709/216 |
| 6,243,750 B1 | * | 6/2001 | Verma | 709/224 |
| 6,260,061 B1 | * | 7/2001 | Krishnan et al. | 709/213 |
| 6,324,182 B1 | * | 11/2001 | Burns et al. | 370/429 |
| 6,347,312 B1 | * | 2/2002 | Byrne et al. | 707/10 |

OTHER PUBLICATIONS

Tatarinov et al. ("Static caching in Web servers", 1997, IEEE, pp. 410–417).*

* cited by examiner

Primary Examiner—Kim Vu
Assistant Examiner—Joon Hwan Hwang
(74) Attorney, Agent, or Firm—Richard A. Tomlin; Jon A. Gibbons; Fleit, Kain, Gibbons, Gutman & Bongini P.L.

(57) ABSTRACT

A method to serve web pages from a server linked to a network of a plurality of clients, the server coupled to a plurality of data pages and to an access log. The method begins with reading an access log to collect data identifying pages that are most frequently accessed by a plurality of clients. The pages are retrieved, at least in part, from a database server coupled to a database storage. The one or more pages are stored in a cache as identified by the access log, where each of the pages are identified in the access log with at least one category of a search criteria received from the clients. An access request is received from one or more clients for a page based upon the search criteria received from the clients. The page from cache is retrieved if the page which has been requested was previously stored in cache. On the other hand, if the page, which has been requested, was not previously stored in cache then the page is retrieved from database storage. The page, which has been retrieved either locally from cache or from the database storage, is transmitted to the one or more clients requesting the page. A list is presented to the clients which includes the at least one category of a search criteria representing the pages that are most frequently accessed from the clients.

12 Claims, 5 Drawing Sheets

METHOD FOR IMPROVING THE PERFORMANCE OF A WEB SERVICE BY CACHING THE MOST POPULAR (REAL-TIME) INFORMATION

CROSS-REFERENCE TO RELATED APPLICATIONS

Not applicable

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

The invention disclosed broadly relates to the field of computers computing, and more particularly relates to the menu items in the field of graphical user interfaces.

2. Description of the Related Art

There are many reasons why the World-Wide-Web (Web) has become very popular, ranging from the ease of being able to have access to more information, companies can reach a lot of people (customers), and the user-friendliness of today's browsers, and there is efficiency in regards to time. A feature known as hypertext allows a user to access information from one Web page to another by simply pointing (using a pointing device such as a mouse) at the hypertext and clicking. One other important feature of the Web is its ability to process information in remote web pages without the requirement of having a specialized application program for each kind of content accessed. Thus, the same content is viewed across different platforms.

Despite many efficiencies of the Web, there are many areas for improvement. Web service providers are always looking for ways to improve their performance. Waiting in general to access web pages and database can be very frustrating. The quickest way to return information to the end-user is by keeping the information in a memory "cache", as opposed to accessing it from disk or from a database. A "cache" is a special type of internal high-speed memory to store both instructions and data. Whenever the central processor needs to access memory, it will first look in the cache. If the data is found in the cache, the data is read much faster, and this is known as a "cache hit". If the data is not found in the cache, the processor must then access the slower external memory, which is known as a "cache miss".

Although caching is useful, there is still a problem in determining what information should be kept in cache. Resources can be limited on a Web server that must support millions of hits a month. Keeping information in cache that won't benefit the general public or most valuable customers would be wasteful. If the web service provider decides it will keep the most commonly accessed information in cache, this will cause another problem of determining what information is most popular. A web service does not typically have this information readily available. The nature of this "most popular" information is dynamic. Therefore, a need exists for a method and system to overcome this problem.

Many times the users of Web information want to understand which information is most popular. For example, a user performing a query against an online database such as electronic yellow page directory listings may want to see what the most popular listings are based on user access for a restaurant, a car dealership, a movie theater or some other criteria. The publishers of these databases examine database traffic and other files to determine which lists are the most popular based on user access. Today, this listing is static, that is, the publishers do not have a method or apparatus to update these pages automatically. In order to keep these lists updated, many times the publishers or providers of these online databases must manually update the most popular page headings. Accordingly, a need exists for an automatic method to enable publishers and providers of online database information to automatically provide users the list of the most popular data.

SUMMARY OF THE INVENTION

Briefly, in accordance with the present invention, a method to serve web pages from a server linked to a network of a plurality of clients, the server coupled to a plurality of data pages and to an access log. The method comprising the steps of: reading the access log to collect data identifying pages that are most frequently accessed by the clients; storing the one or pages in a cache as identified by the access log; receiving an access request for one or more clients for a page; determining whether the request is for the page is stored in the cache; retrieving the requested the page from the cache when the page is found; transmitting the page to one or more clients requesting access.; and a list of the pages most frequently accessed by the clients from the access log is presents to the clients. This provides clients feedback with the most popular pages based on a specific request.

In accordance with another embodiment of the present invention, an information processing system and computer readable storage medium is disclosed for carrying out the above method.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION OF AN EMBODIMENT

Figure 1:
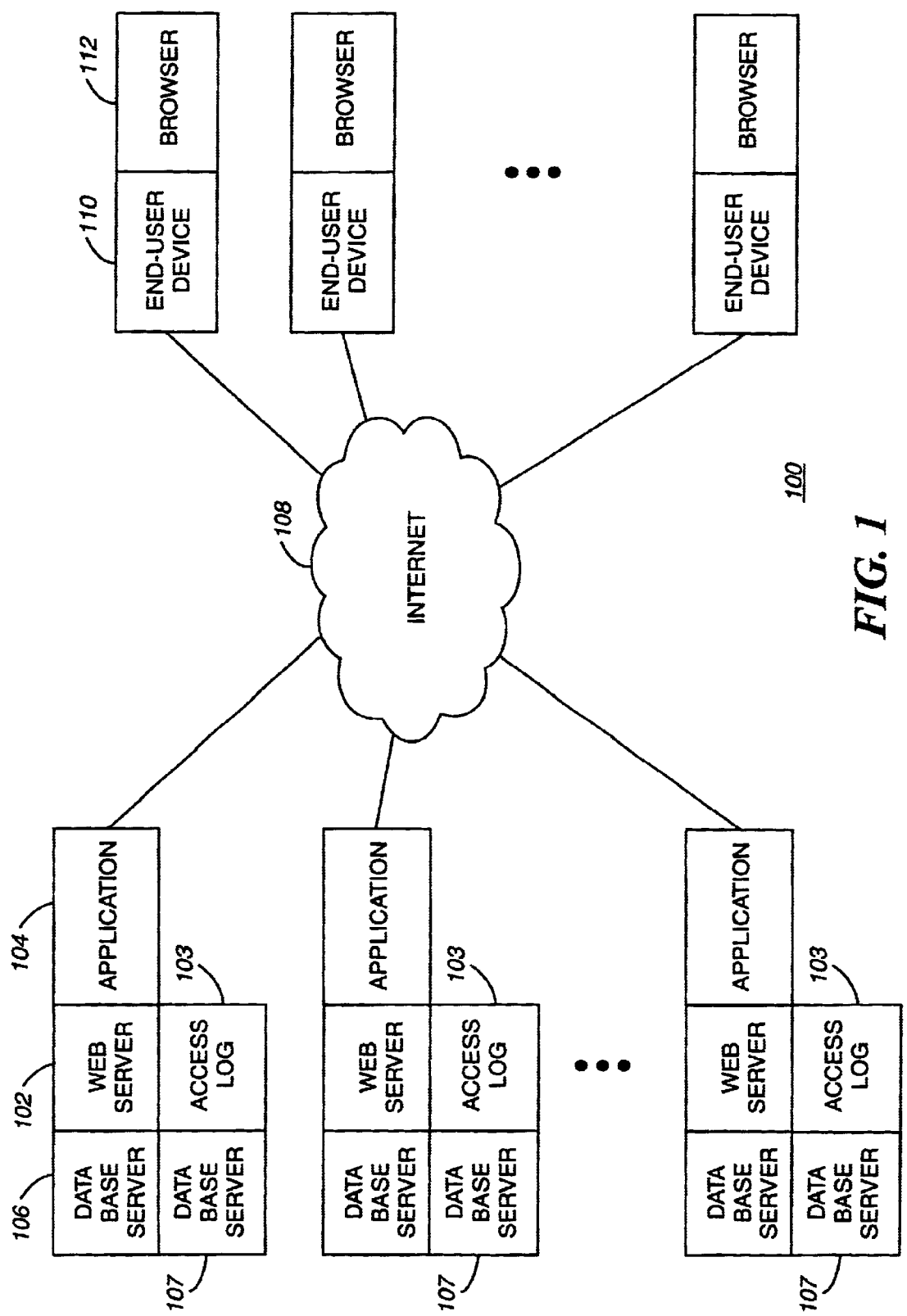
FIG. 1 is a functional block diagram of a client-server system for hosting Web pages, according to the present invention.

An Embodiment of the Hardware and Software Systems

Referring now in more detail to the drawings in which like numerals refer to like parts throughout several views, FIG.

1 depicts a functional block diagram of a client-server system 100 for hosting Web pages, according to the present to invention. The term "page" or "pages" (depending on the context) as used in the summary, specification, and claims means any logical collection of data or information such as HTML, XML, or data returned from a Web service, such as data from a search result. A Web server 102 running a Web server application 104 and coupled to a data base server 106. The Web server 102 can be an IBM compatible computer capable of running any HTTP (Hyper-Text-Transfer-Protocol) compatible server software such as Netscape Web server products or equivalent. The Web server 102 is connected to the Internet 108. An end user data processing device 110 with Web browser 112 is connected to the Internet 108 or other computer network. The Web browser 112 can be any HTTP compatible product such as Netscape Navigator, Sun Hot Java Browser, Microsoft Internet Explorer, or any equivalent. It is important to point out that the precise operating systems and hardware configurations of the database server 106, the Database Storage 107, the Web server 102, the access log 103, the end user device 110 and the Web-browser 112 are not limited to any specific hardware or software configuration. These systems can be implemented on a wide variety of hardware and software platforms.

The search engine application 104 provides searching services running on the Web server 102 for listing information stored on database server 106 to be rendered over Internet 108 on Web browser 112. An end user has the ability to enter desired search criteria into the application 103. The access log 103 logs all of the information regarding which Web pages have been accessed by end-user device 110. The Web browser 112 through Internet 108, communicates with the Web server 102 to query the database server 106, which stores information in the database storage 107. The results of the search from database server 106 are then sent back, through the Web server 102 and over the Internet 108, to the end user browser 112.

Figures 2, 3:
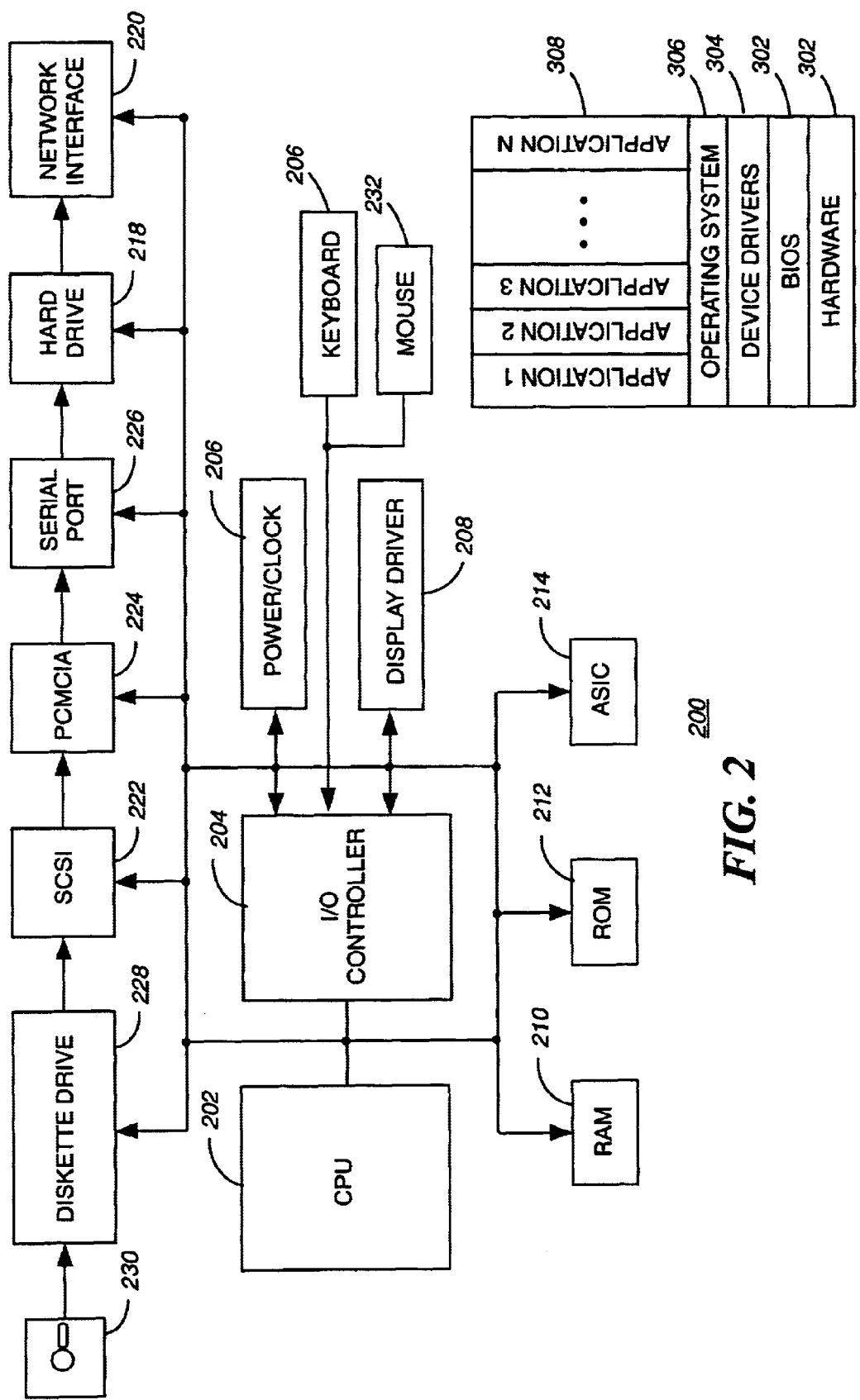
FIG. 2 is a block diagram of the major electrical components of a Web server of FIG. 1 according to the present invention.
FIG. 3 is block diagram illustrating the software hierarchy for the information processing system FIG. 2 according to the present invention.

FIG. 2, shows a block diagram of the major electrical components 200 of a Web server 102 of FIG. 1 used in accordance with this invention. The electrical components include: a central processing unit (CPU) 202, an Input/Output (I/O) Controller 204, a system power and clock source 206; display driver 208; RAM 210; ROM 212; ASIC (application specific integrated circuit) 214 and a hard disk drive 218. A keyboard 216 with a mouse 232 receives the end-user input. These are representative components of a computer. The operation of a computer comprising these elements is well understood. Network interface 220 provides connection to a computer network such as Ethernet, TCP/IP or other popular protocol network interfaces. Optional components for interfacing to external peripherals include: a Small Computer Systems Interface (SCSI) port 222 for attaching peripherals; a PCMCIA slot 224; and serial port 226. An optional diskette drive 228 is shown for loading or saving code to removable diskettes 230 or equivalent computer readable media such as CD-ROM, removable storage medium and optical character scanning. The system 200 may be implemented by combination of hardware and software. Moreover, the functionality required for using the invention may be embodied in computer readable media (such as 3.5 inch diskette 230) to be used in programming an information-processing apparatus (e.g., a personal computer) to perform in accordance with the invention.

FIG. 3 is block diagram illustrating the software hierarchy for the information processing system FIG. 2 according to the present invention. The hardware 302 is the Information processing system FIG. 3. BIOS (Basic Input Output System) 304 is a set of low level computer hardware instructions, usually stored in ROM 212, for communications between an operating system 308, device driver(s) 306 and hardware 302. Device drivers 306 are hardware specific peripherals such as a mouse 232, CD ROM drive or printer. Applications 310 are software applications written in C/C++, Java, assembler or equivalent. Operating system 308 is the master program that loads after BIOS 304 initializes, that controls and runs the hardware 302. Examples of operating systems include DOS, Windows 3.1/95/98/NT, UNIX, Macintosh, OS/2, and equivalent. The functionality on the present invention can be part of the search engine application 104 or as an application 310 separate from the search engine application 104.

Although this embodiment has shown a client-server-based implementation for a search engine, in another embodiment, the search engine is searching a database on a local information processing system, such as a database on a CD-ROM and the teachings of this present invention operate in this standalone implementation as well.

Figure 4:
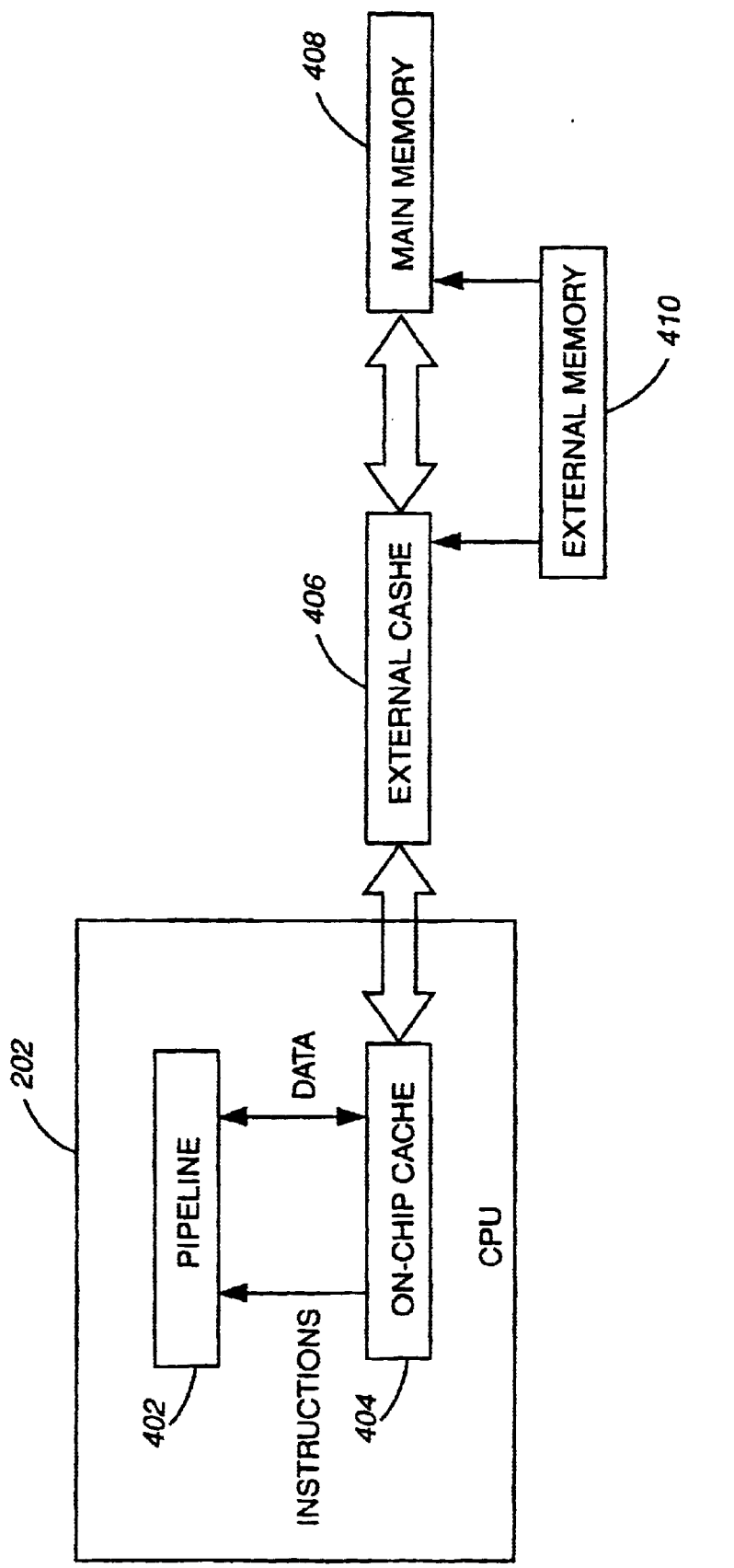
FIG. 4 is a block diagram of the instruction and data caches of the Web server of FIG. 2, according to the present invention.

FIG. 4 is a block diagram of the instruction and data caches of the Web server 102 of FIG. 1. Cache is a special high-speed RAM 210 used to help speed up accesses to memory and reduce traffic on the processor's busses. As indicated in FIG. 4, an on-chip cache 404 is used to feed instructions and data to the CPU 202 through the pipeline 402. When an instruction or data operand is required from main memory 408, the on-chip cache 404 will be searched first. If the instruction or data is found in the cache, i.e. a "cache hit", a copy is sent to the pipeline 402 very quickly. When the required instruction or data is not found in the internal cache i.e., a "cache miss", the processor is forced to go to external memory 410. An external cache 406 (also called a second-level cache), is examined next. If there is another-miss, or there is no external cache, the main memory 408 is accessed. A copy of the instruction or data from main memory 408 is written to the cache so that it will be there if needed again.

An Embodiment of the Process Flow

Figure 5:
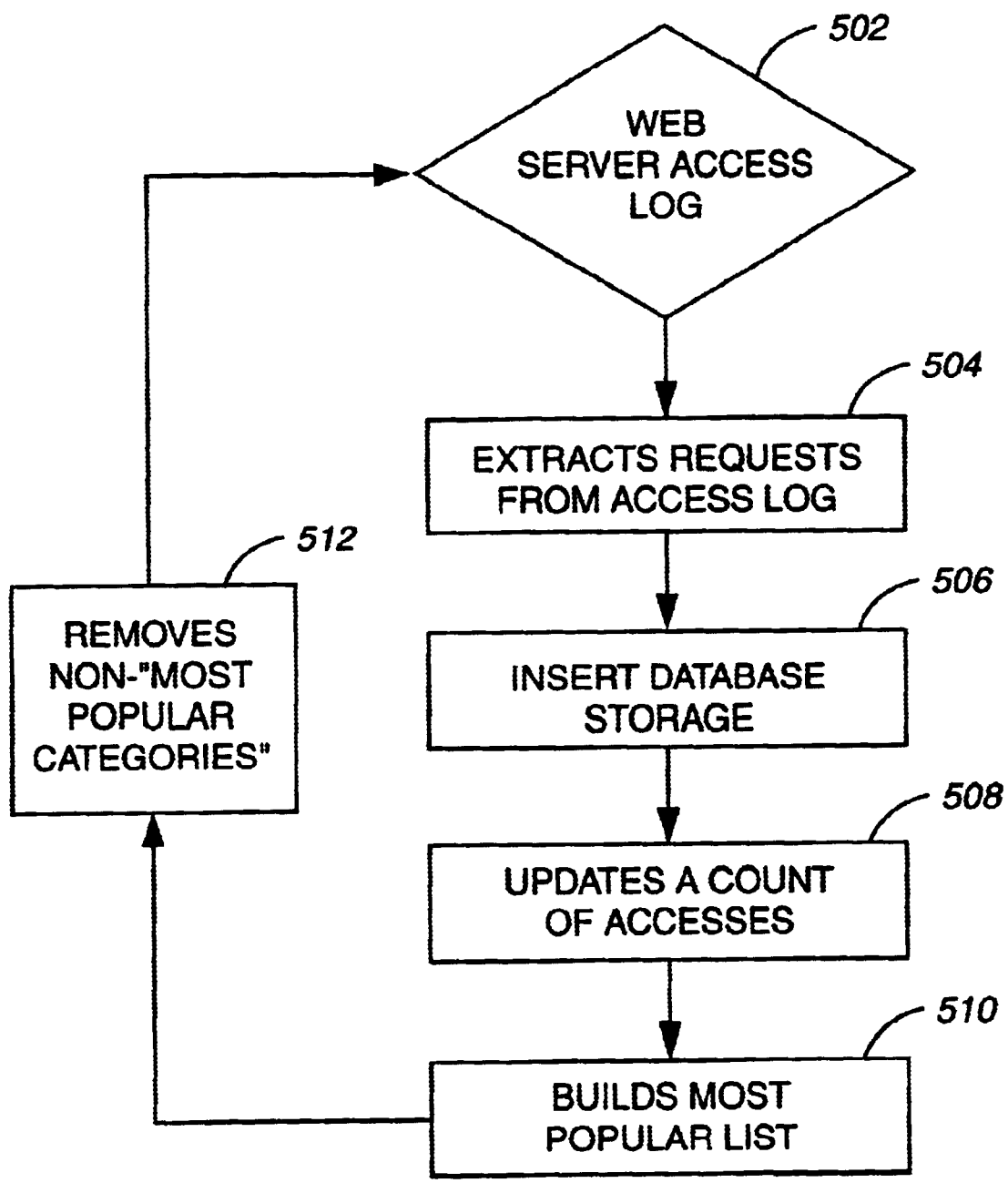
FIG. 5 is a flow diagram of the analysis and building of the most popular category list of a Web server of FIG. 1, used in accordance with this invention.

FIG. 5 is a flow diagram 500 of the analysis and building of the most popular category list of a Web server 102 of FIG. 1, used in accordance with this invention. In one embodiment FIG. 5 uses the context of a Web service for Electronic Yellow Pages (EYP), with respect to the most popular yellow pages headings requested. Each time the Web server 102 is accessed, or on a periodic time interval, the Web server's access log 103 can be examined by a background thread/process step 502. This thread/process extracts all requests for yellow pages headings from the Web server access log 103, step 504. It then inserts category access information into database storage, step 506. Next in step 508 it performs/updates a count of the number of accesses per category from database based on the desired time interval. Step 510 builds the most popular category list, like "top 10 categories." Prior categories that are no longer the most popular are removed, step 512. The Web service updates its list stored in database 107 of "most popular" headings to cache based on access count information 508. It should be understood that the most popular heading can be based on the Web server's access log 103.

Figure 6:
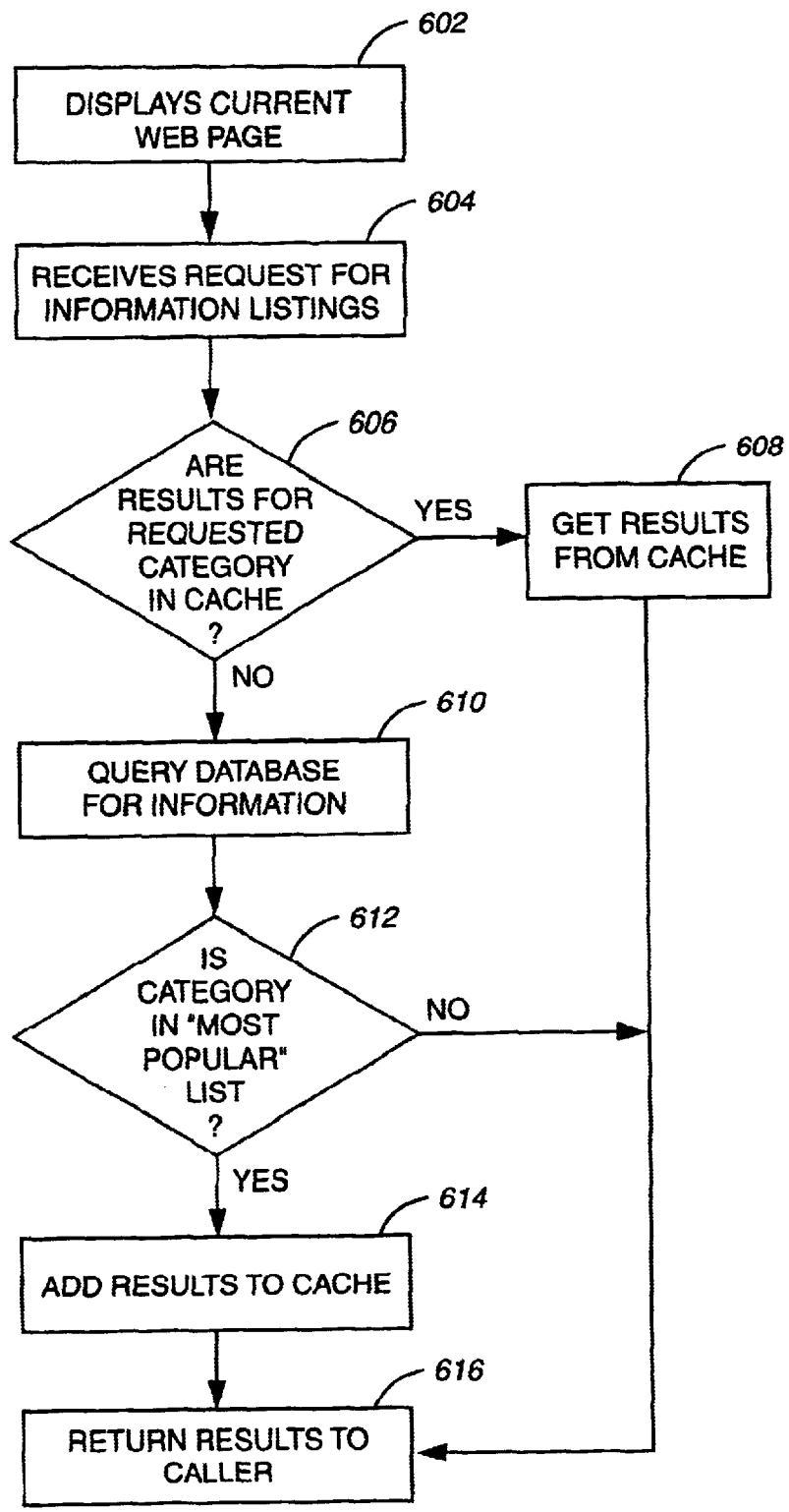
FIG. 6 is a flow diagram of the most popular categories of FIG. 5, and how it is cached by the Web server, according to the present invention.

FIG. 6 shows a flow diagram 600 of the "most popular" categories according to FIG. 5 and how it is cached by the Web server 102, according to the present invention. The Web server 102 displays a current web page, step 602. In one embodiment, the most popular Web pages are displayed to the user. These most popular web pages provide a fast path to access the most popular categories under a particular service. Using the electronic yellow pages example, the most popular Web pages can be categorized by topics, categories, and headings such as automobiles, doctors, restaurants.

Returning to flow diagram of FIG. 6, when the web service gets a request for information listings 604, it checks to see if the "yellow pages" heading requested is on its cache list, step 606. If the listings for this heading have already been cached, it immediately returns the cached listings to the caller, steps 608 and 616. If however, the listings for this heading have not been cached yet, it pulls the information from the database storage 107, step 610 and if the information is not in the cache, step 612, it caches the listings for future use 614. Then it will return the listings to the caller 616.

While the invention has been illustrated and described in the preferred embodiments, those therein skilled in the art may affect many modifications and changes. It is to be understood that this invention can be applied to any web service, it is not yellow pages specific as described above.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A method on a server linked to a network of a plurality of clients, the server coupled to a plurality of data pages and to an access log, the method comprising:

reading an access log as part of a database server to collect data identifying pages that are most frequently accessed based up on counts at accesses by the a plurality clients, wherein the pages are retrieved at least in part from the database server coupled to a database storage;

storing one or more pages in a cache as identified by the access log, where each access request of the pages are identified in the access log with at least one category of a search criteria received from the clients;

receiving an access request from one or more clients for a page based upon the search criteria received from the clients;

retrieving the page from the cache if the page which has been requested was previously stored in cache and if the page which has been requested was not previously stored in cache then retrieving the page from database storage;

transmitting the page to the one or more clients requesting the page; and presenting to the clients a list which includes the at least one category of a search criteria the representing the pages that are most frequently accessed based upon counts of accesses from clients.

2. The method of claim 1 wherein the page comprise electronic yellow page information.

3. The method of claim 1 further comprising:

examining the access log by a background thread/process each time the server is accessed.

4. The method of claim 1 further comprising:

examining the access log by a background thread/process on-a periodic basis.

5. A method on a Web server coupled to a database for serving data files stored in the database the Web server linked to a plurality of client systems, the method comprising the steps of:

maintaining an access log as part of a database server with data files most frequently accessed based upon counts of accesses by a plurality of client systems, wherein the data files are retrieved at least in part from the database server coupled to a database storage and the access log contains each access request of the data files;

storing the data files listed in the access long in cache, wherein each of the data filed are identified with at least one category of a search criteria received from the client systems;

receiving a request for at least one of the data files based upon at least one search criteria received from at least one of the client systems;

reviewing the access log to determine whether the data files requested are listed in the access log;

transmitting the data files requested from the cache if the data files requested are listed in the access log;

transmitting the data files requested from the database if the data files requested are not listed in the access log;

updating the access log to list the data files requested so that the most request data files are listed; and presenting to the client systems a list which includes the at least one category of a seach criteria representing the data file that are most frequently accessed based upon counts of accesses from the clients.

6. The method according to claim 5, wherein the step of maintaining an access list further comprises the steps of:

maintaining an access list for data files that comprise electronic yellow pages listing, wherein the electronic yellow pages are categorized based on a yellow pages heading;

maintaining a counter for each yellow pages heading;

wherein the step of storing the data files listed in the access log in a cache includes storing data files listed that have the highest counter value associated therewith; and wherein the step of updating including updating the counter for each yellow pages heading requested.

7. The method according to claim 6 further comprising the steps of:

creating a list of the most popular pages within a heading; and transmitting the list of the most popular pages along with data files transmitted.

8. A computer readable medium comprising programming instructions for a Web server coupled to a database for serving data files stored in the database, the Web server linked to a plurality of client systems, the programming instructions comprising:

reading an access log as part of a database server to collect data identifying pages that are most frequently accessed based upon counts of accesses by a plurality of clients, wherein the pages are retrieved at least in part from the database server coupled to a database storage;

storing one or more pages in a cache as identified by the access log, where each access request of the pages are identified in the access log with at least one category of a search criteria received from the clients;

receiving an access request from one or more clients for a page based upon the search criteria received from the clients;

retrieving the page from the cache if the page which has been requested was previously stored in cache and if the page which has been requested was not previously stored in cache then retrieving the page from database storage;

transmitting the page to the one or more clients requesting the page; and presenting to the clients a list which Includes the at least one category of a seach criteria representing the pages that are most frequently accessed based upon counts of accesses from the clients.

9. The computer readable medium according to claim 8, further comprising instructions for:

examining the access log by a background thread/process each time the server is accessed.

10. The computer readable medium according to claim 8, further comprising instructions for:

examining the access log by a background thread/process on a periodic basis.

11. A Web server for serving Web pages to a plurality of client systems linked via a network therewith, the server comprising:

an interface coupled to a database for reading database storage;

an access log to collect data identifying pages that are most frequently accessed based upon counts of accesses by the clients, wherein the pages are retrieved at least in part from a database server coupled to a database storage and the access log contains each access request of the data files;

a cache as part of the database server for storing one or more pages therein as identified by the access log, whereby each of the pages are identified in the access log with at least one category of a search criteria received from the clients;

means for receiving an access request from one or more clients for a page based upon the search criteria received from the clients;

means for retrieving the page from the cache if the page which has been requested was previously stored in cache and If the page which has been requested was not previously stored in cache then retrieving the page from database storage;

means for transmitting the page to the one or more clients requesting access along with a list of at least the pages that are most frequently accessed from the clients based on tho access log.

12. The Web server according to claim 11, wherein the access log to collect data identifying pages that are most frequently accessed by the clients is categorized as a yellow page listing and the list of at least the pages that are most frequently accessed from the clients based on the access log is based on a specific category from which the client requested information in the yellow page listing.

* * * * *